United States Patent [19]
Lozano et al.

[11] Patent Number: 5,982,869
[45] Date of Patent: Nov. 9, 1999

[54] SYSTEM AND METHOD FOR AUTOMATICALLY GENERATING A ROUTING PLAN FOR INTERNATIONAL TELEPHONY

[75] Inventors: Elena Lozano, Plano; Edmund W. Peaslee, Dallas; Brett Carson, Frisco, all of Tex.

[73] Assignee: MCI Communications Corporation, Washington, D.C.

[21] Appl. No.: 08/672,198

[22] Filed: Jun. 27, 1996

[51] Int. Cl.[6] .................................................. H04M 7/00
[52] U.S. Cl. ........................ 379/220; 379/222; 379/224; 379/229
[58] Field of Search .................................. 379/207, 219, 379/220, 221, 222, 224, 229, 230

[56] References Cited

U.S. PATENT DOCUMENTS 5,311,585   5/1994  Armstrong et al. ..................... 379/221
5,375,167  12/1994  Bales et al. .......................... 379/219 X
5,406,620   4/1995  Pei ..................................... 379/221 X

OTHER PUBLICATIONS

Bellamy, John, *Digital Telephony*, Second Edition, John Wiley & Sons, Inc., U.S.A., 1991, pp. 12–16.

Primary Examiner—Harry S. Hong

[57] ABSTRACT

A system and method for automatically configuring routing for international telephone calls in a hierarchy of switches. The present invention provides a set of routing rules to route international telephone calls through a hierarchy of switches. The rules act upon data stored in a computer. The data is stored in a configuration table. The configuration table contains information describing network topology. Using the network topology data, the rules generate routing tables. The routing tables provide routing for international telephone calls through a switch hierarchy.

21 Claims, 9 Drawing Sheets

SYSTEM AND METHOD FOR AUTOMATICALLY GENERATING A ROUTING PLAN FOR INTERNATIONAL TELEPHONY

BACKGROUND OF THE INVENTION

1. Field of the Invention

The present invention relates generally to switch routing in a telecommunications network. More particularly, the present invention relates to generating international switch routing according to a set of rules describing desired routing behavior using a description of a switch hierarchy.

2. Related Art

Long distance telephone service is provided via a hierarchical network of switches. Each switch within the hierarchy is responsible for providing a connection from each input to the switch to each output of the switch. The switches connect sources of telephone calls to their destination. A familiar example is where a caller in a first city, the source, desires to call a recipient in a second city, the destination. The switches in the hierarchy route the call from the caller to the intended recipient. The hierarchical organization of the network evolved in response to an increased number of subscribers, and demand for longer distance communications. The hierarchical system of switches provides a large amount of flexibility for routing calls between switches. Routing for domestic calls (within United States) has been automated to take advantage of the flexibility. In domestic routing, a computer automatically configures the routing of a network according to a specific set of routing rules.

Unfortunately, the situation is not so refined for the case of international call routing. This is due to an additional complexity in the switch hierarchy. The additional complexity results from gateway switches that are used to route international calls to an appropriate country. Every international call must be routed through a gateway switch if it cannot be directly routed to the country. Instances of direct routing are rare. Moreover, international calls provide multiple services, whereas conventional domestic calling only provides one service, voice. Different routing schemes are often required for the different services available with international calls.

Conventionally, configuring the switches to route international calls through a domestic network has been a manual process. The process entails reconfiguring domestic switches to identify and route international calls to a gateway switch. Because of the extensive amount of human intervention required to reconfigure the switches, the process is not only time consuming, but the potential for error is significant. As more countries are added to an international network, the manual process become even more cumbersome and consequently, the potential for error increases. Thus, what is required is an automatic routing system to automatically configure a network's routing to route international telephone calls through a domestic network to a gateway switch.

SUMMARY OF THE INVENTION

The present invention is directed to a system and method for automatically configuring routing for international telephone calls in a telecommunications system having a hierarchy of switches. The present invention provides a set of routing rules to route international telephone calls through the hierarchy of switches. A routing generator applies data stored in a computer to the rules to generate the routing. The data is stored in configuration tables called network description tables. The network description tables contain information describing network topology. Operating on the network description data stored in the network description tables, the rules generate routing tables. The routing tables provide routing information to route international telephone calls through the switch hierarchy.

The present invention also provides a mechanism for downloading data from the routing tables to switches in the switch hierarchy. Each switch in the switch hierarchy stores a routing table corresponding to routing for that switch. Because the routing generator produces routing tables having a generic format, the routing tables so produced must be converted into a format that is understandable to the switches prior to being stored therein. The present invention incorporates a translator between the routing generator and the switch to provide this format conversion.

The present invention also introduces partitions to store information for routing for particular services in partitions. Partitions provide a convenient, easy, and efficient mechanism for associating a particular routing scheme to a particular service.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention provides a routing paradigm for routing international telephone calls through a domestic switch hierarchy to an appropriate gateway switch. International telephone calls are telephone calls directed to a foreign country. A foreign country is a country other than the one from which an international call is generated. There can be one or more gateway switches in the switch hierarchy of the preferred embodiment. Within each gateway switch, a set of routing rules provides appropriate routing to ensure that a call destined for a particular country reaches the particular country.

Figure 1:
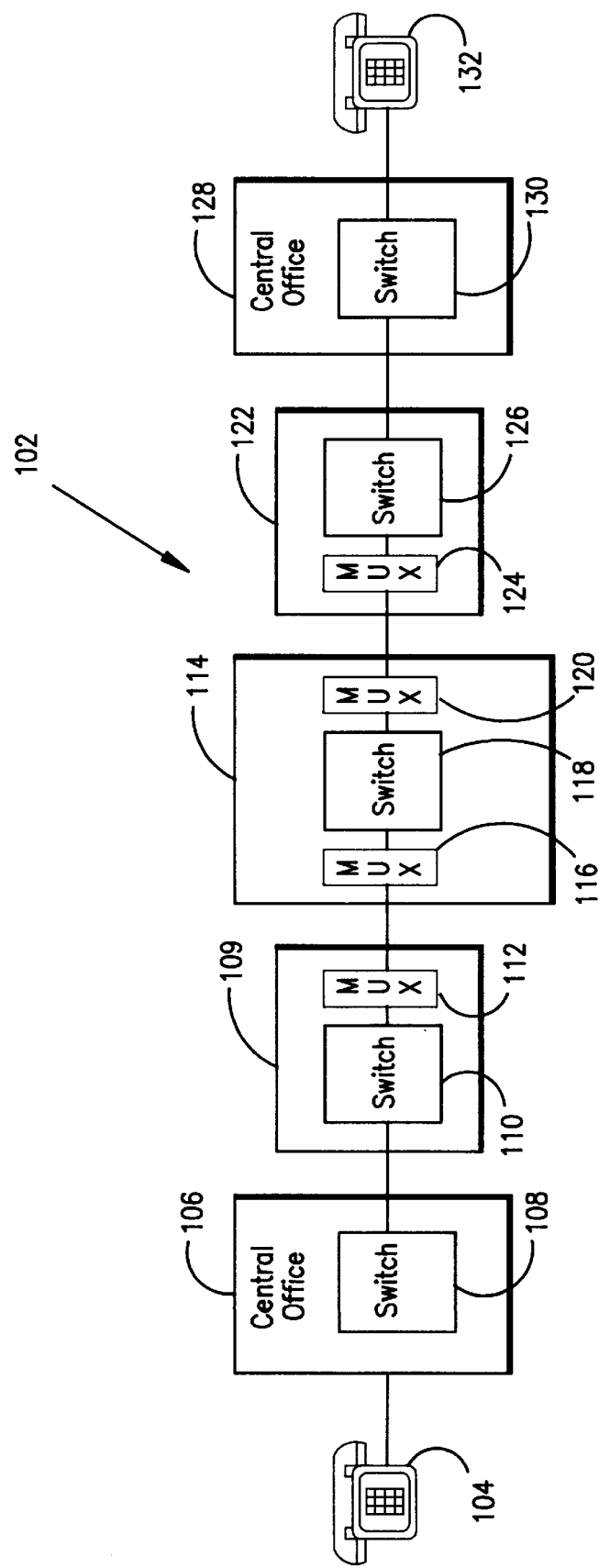
FIG. 1 is a switch hierarchy for routing telephone calls.

Referring to FIG. 1, a domestic switch hierarchy 102 is described.

Conventionally, there are five classes of switches that are used to build the domestic hierarchy 102. Class 5 switches, such as switches 108 and 130, are typically used in a terminal or a central office, such as central offices 106 and 128. A class 5 switch 108 or 130 connects directly to the telephone subscriber 104 or 132. For long distance or international calls, a class 5 switch 108 or 130 hands off a particular long distance provider's (e.g., MCI) traffic from a local service provider to the nearest switch operated by the particular long distance provider.

Class 4 switches (not shown) are situated between class 5 switches and class 3 switches (described below). Class 4 switches are toll switches. Toll switches are used to keep track of call billing and call routing of local class within intra-LATA areas. A LATA is a local access and transport area. Essentially, a LATA is the area of service provided by a local exchange carrier (LEC). Thus, an intra-LATA call is a call within the area serviced by a LEC. In today's networks, LECs can complete calls only within their LATA, i.e., local calls. Long distance, or inter-LATA calls are completed by long distance carriers such as MCI. However, where the geographic area serviced by a LATA is large, some intra-LATA calls can be long distance calls. Intra-LATA calls are carried on a switch called a toll switch. For example, a call from Fort Worth, Tex. to Dallas, Tex. is an intra-LATA call. However, the call is treated as a long distance call due to the distance of the call. Accordingly a toll switch is used in Fort Worth to pass the call to the terminating office.

In the preferred embodiment, class 3 switches, such as switches 110 and 126, are operated by a long distance or international call service provider. In the preferred embodiment, the class 3 switches 110 and 126 are housed in facilities 109 and 122 respectively. A class 3 switch 110 or 126 accepts traffic from a class 5 switch 108 or 130. This traffic is generally localized to a specific city or some similarly smaller geographic area than is covered by a class 2 switch (described below).

A class 2 switch (not shown) is an MCI or other long distance carriers switch that is situated between a class 1 switch and a class 3 switch. Class 2 switches are more regional in scope than class 3 switches. Regional scope refers to the region covered by a switch. Class 2 switches concentrate traffic from several class 3 switches. In addition, class 2 switches can be configured to handle overflow traffic from class 3 switches. Class 2 switches process the majority of inter-regional long distance calls. Moreover, class 2 switches can be configured to send overflow traffic to class 1 switches (described below). In the preferred embodiment, the class 2 switches have been reclassified as class 3 switches.

Class 1 switches, such as switch 118 are housed in a facility such as facility 114. The class 1 switch 118 is also referred to as a tandem. A class switch collects traffic from Class 2 or Class 3 switches. A Class 1 switch 118 routes calls to the trunks needed to carry a call out of a particular region of the country. The Class 1 switch 118 also functions as a concentration point for the traffic to reduce the amount of cross country transmission facilities needed.

Switches of some classes can home functionality generally found on switches of other classes. For example, although class 5 switches generally home the central office function, the central office function can be homed on class 4, 3, or 2 switches. Similarly, toll center switches (normally class 4) can be homed on class 3 or 2 switches. The local class 3 switch interexchange function can also be homed on class 2 or 1 switches. The regional interexchange function can be homed on class 1 switches.

Once a telephone subscriber, such as telephone subscriber 104 places a call, that call is processed. Call processing refers to parsing an "address" or destination code, more commonly referred to as a telephone number, to determine where a call is intended to go. Telephone numbers in North America conform to the North American Numbering Plan (NANP). The NANP is a series of numeric codes to identify a specific geographic region and central office within the area nearest to the telephone number being called.

Figure 2:
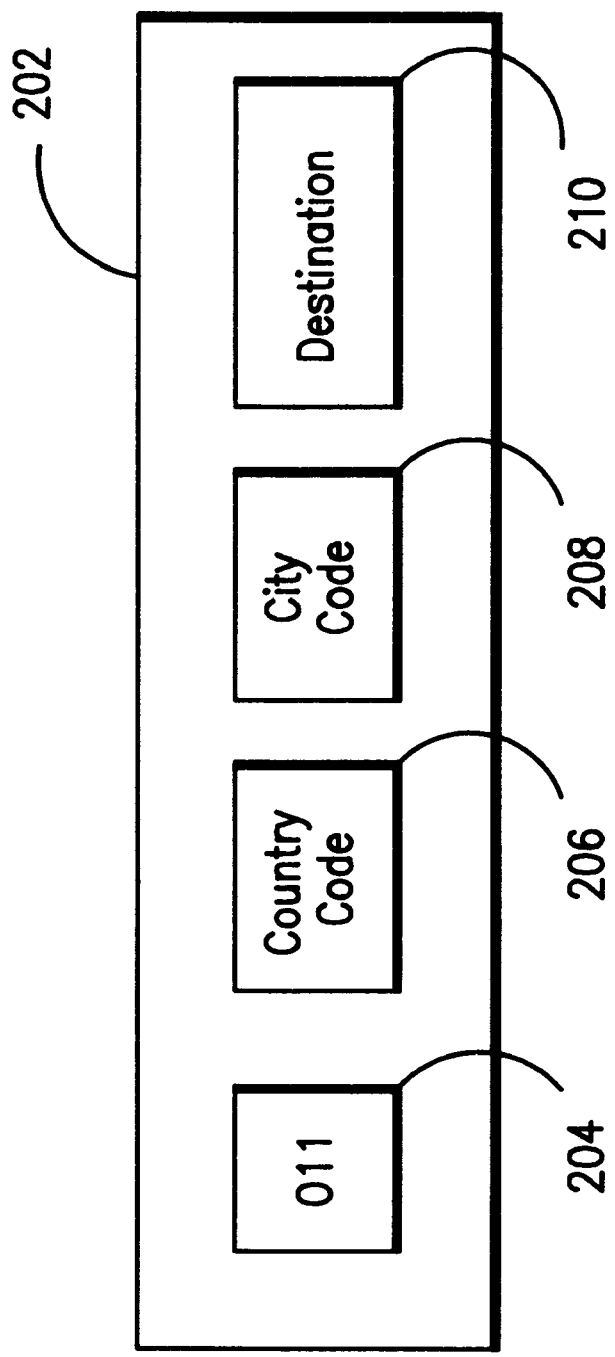
FIG. 2 is a telephone number according to the North American Numbering Plan.

As shown in FIG. 2, there are two basic components of an NANP telephone number 202. The first is a 3 digit area code 204, called the number plan area (NPA). The NPA 204 conforms to the following format: "N 0/1 X," where N is any digit 2–9, X is any digit 0–9, and 0/1 is either 0 or 1. The second is a 7 digit Directory Number 205. The Directory Number 205 is further divided into two components. The first component of the Directory Number 205 is a 3-digit Local Exchange 206, called and NXX. The NXX 206 identifies the local central office. The second component of the Directory Number 205 is a 4-digit Station Number 208. The station number 408 identifies the local telephone subscriber being called. The directory number 205 conforms to the following format: "NNX-XXXX," where N is any digit 2–9, and X is any digit 0–9.

Using numbers conforming to the NANP, switches in a switch hierarchy such as switch hierarchy 102 can determine where to send calls. This is done by screening portions of the NANP telephone number. If the switch "recognizes" a number that it is supposed to process, it processes the number. For example, a central office scans the NXX 206. If the central office recognizes the NXX as its home exchange, it will screen the station number.

It should be noted that routing is distinct from call processing. Call processing refers to the process whereby a switch parses a telephone number to determine where a call should be sent. Routing on the other hand refers to the process of setting up physical communication paths between the different switches in a switch hierarchy.

The present invention uses the basic switch hierarchy 102 and augments it with switches required to handle international calls. For example, the present invention acts on a hierarchy containing another class 3 switch known as a gateway. The gateway generally provides homing for one or more countries to which calls can be routed. The gateway can be coupled to the class 3 switch 109 and/or a class 1 switch such as switch 114. Given such a digital switch hierarchy 102, the present invention generates routing tables. The routing tables are downloaded into each switch in the hierarchy 102. A unique routing table can be downloaded to each switch in the switch hierarchy. When a switch subsequently processes a telephone call, the switch routes the call to another switch in the hierarchy 102 according to the routing table. When the call gets to the next switch, the process repeats. That is, the switch to which the call was transferred determines which switch to send the call to according to its own routing table. The process continues until the call reaches its final destination.

To configure routing for a particular network, the present invention generates routing tables, using a routing table generator. The routing table generator inputs a network description table. The network description table contains homing relationships, trunking information, translation information, and control information. The homing relationships describe the network hierarchy. The trunking information describes the interconnections between switches in the hierarchy 102, and their connections to countries. Translation information refers to the actual data translations that are required to enter data into a switch. Translation information enables the preferred embodiment to operate using a generic syntax. The generic syntax is largely independent of switch vendor architecture and internal representation of data. In the preferred embodiment, control information is static data used in the regular operation of the network. For example, the homing arrangements between class 1 and class 3 switches is a type of control information. Using the information contained in the network description table, the routing table generator generates a routing table.

Once generated, the routing table is downloaded to the digital switches. The downloading is accomplished by using a transport mechanism. In general, a unique routing table, created in conformance with the routing rules described below, is downloaded to each switch in the switch hierarchy 102. In the preferred embodiment, the transport mechanism (described below) is software called CommSHIP, or alternatively the CommSHIP interface.

The routing table is created in conformance with a set of routing rules. The routing rules determine a priority order in which the digital switches in the hierarchy 102 attempt to process a call. In the preferred embodiment, the routing rules, in priority order are:

1) Domestic switch to country;
2) Domestic switch to primary home gateway of country for the service;
3) Domestic switch to secondary home gateway of country for the service;
4) Switch to the primary home of the primary gateway;
5) Switch to the secondary home of the primary gateway;
6) Switch to the primary home of the secondary gateway;
7) Switch to the secondary home of the secondary gateway;
8) Switch to own primary home if not in the terminating hierarchy;
9) Switch to own secondary home if not in the terminating hierarchy;
10) Switch to Wide Area Transport Service (WATS).

Routing rules 8 and 9 are only valid if the switch has a home, i.e., it is not a class 1 switch, and the switch is not in the terminating hierarchy.

Figure 3:
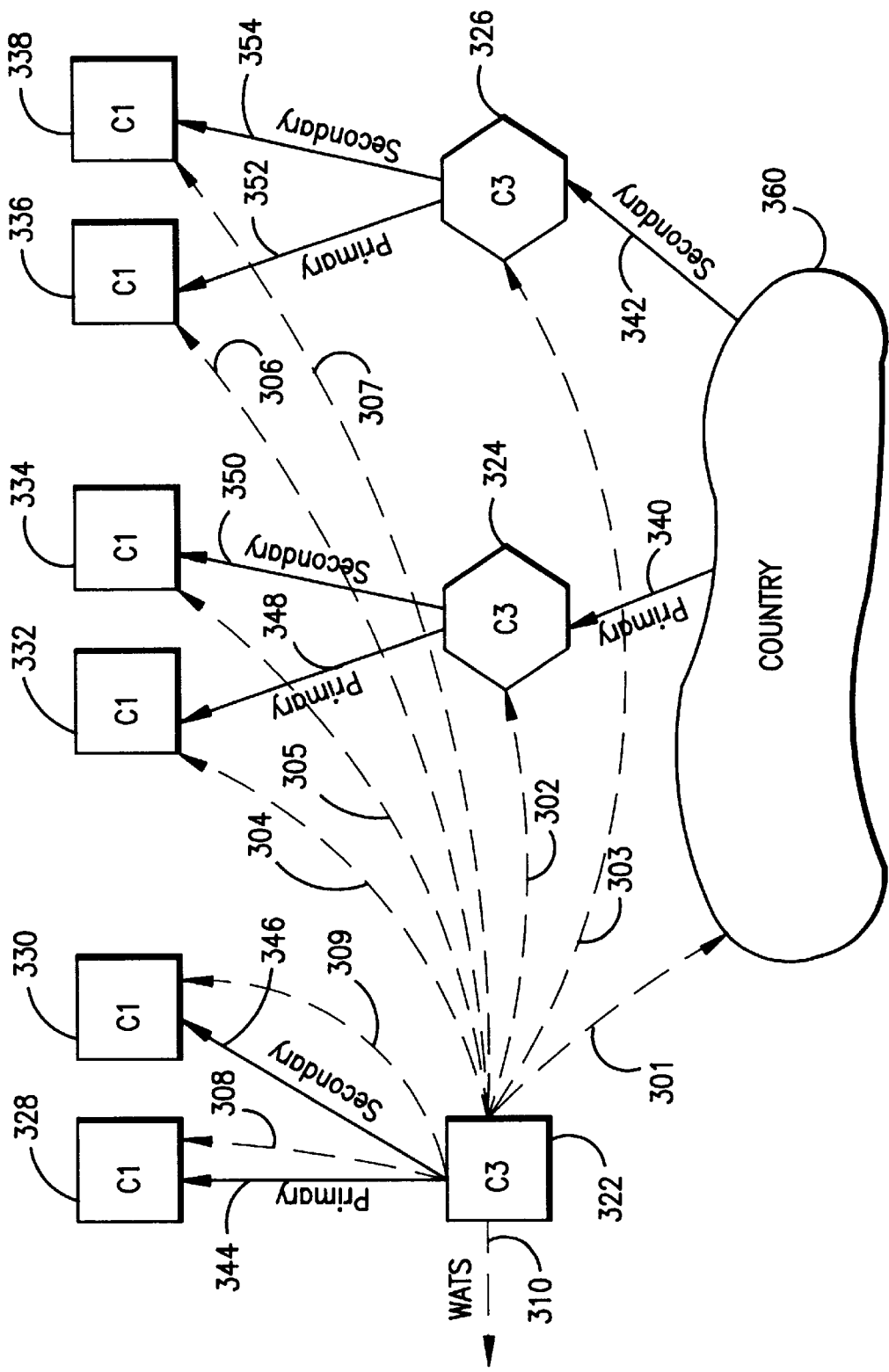
FIG. 3 is a switch hierarchy illustrating routing rules according to a preferred embodiment of the present invention.
Figure 4:
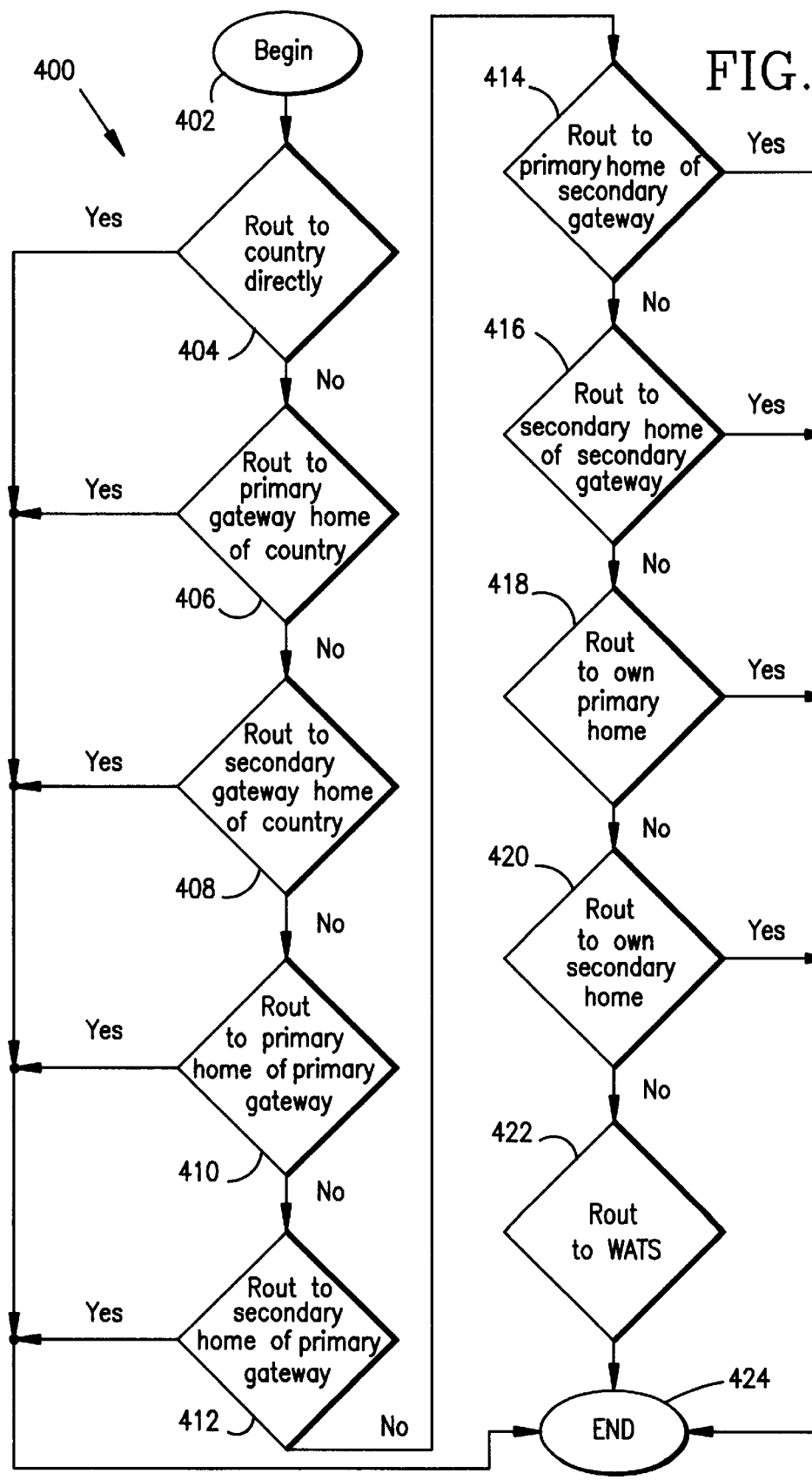
FIG. 4 is a flow chart for generating a routing plan according to a preferred embodiment of the present invention.

FIG. 3 illustrates the routing rules pictorially for class 3 switch 322. FIG. 4 is a flow chart for a routing generation method 400 for generating routing according to the routing rules for routing international telephone calls according to the preferred embodiment. In FIG. 3, a switch hierarchy is represented by class 1 switches 328, 330, 332, 334, 336, and 338 and class 3 switches 322, 324, and 326. The switches in the switch hierarchy are presumed to be located in a particular country in which the switch hierarchy exists. Country 360 is a different country (foreign country) for which telephone call connectivity with the particular country is available. As mentioned above, routing is performed prior to call processing. Routing, therefore, provides links between telephone call processing entities.

Prior to using a switch hierarchy, a routing scheme must be devised to determine where calls are directed when they are processed. That is, which is the next switch in the hierarchy to receive a call for processing. In the preferred embodiment, the routing is stored logically in a routing table in each switch in the hierarchy. Thus, each switch in the hierarchy stores a routing table that controls call routing for the switch. The routing tables are generated in accordance with network description tables. The network description tables contain the relationship between the switch hierarchy and a destination country, routing information, and other descriptive information. In the preferred embodiment, the network description tables are contained in a database management system.

There are three primary types of information stored in the network description tables: switch homing, country homing, and switch partition. While it would be apparent to those skilled in the art that the information can be stored in one network description table, the preferred embodiment stores the information in three distinct tables. The network descriptions tables of the preferred embodiment are described with reference to FIG. 5.

Figure 5:
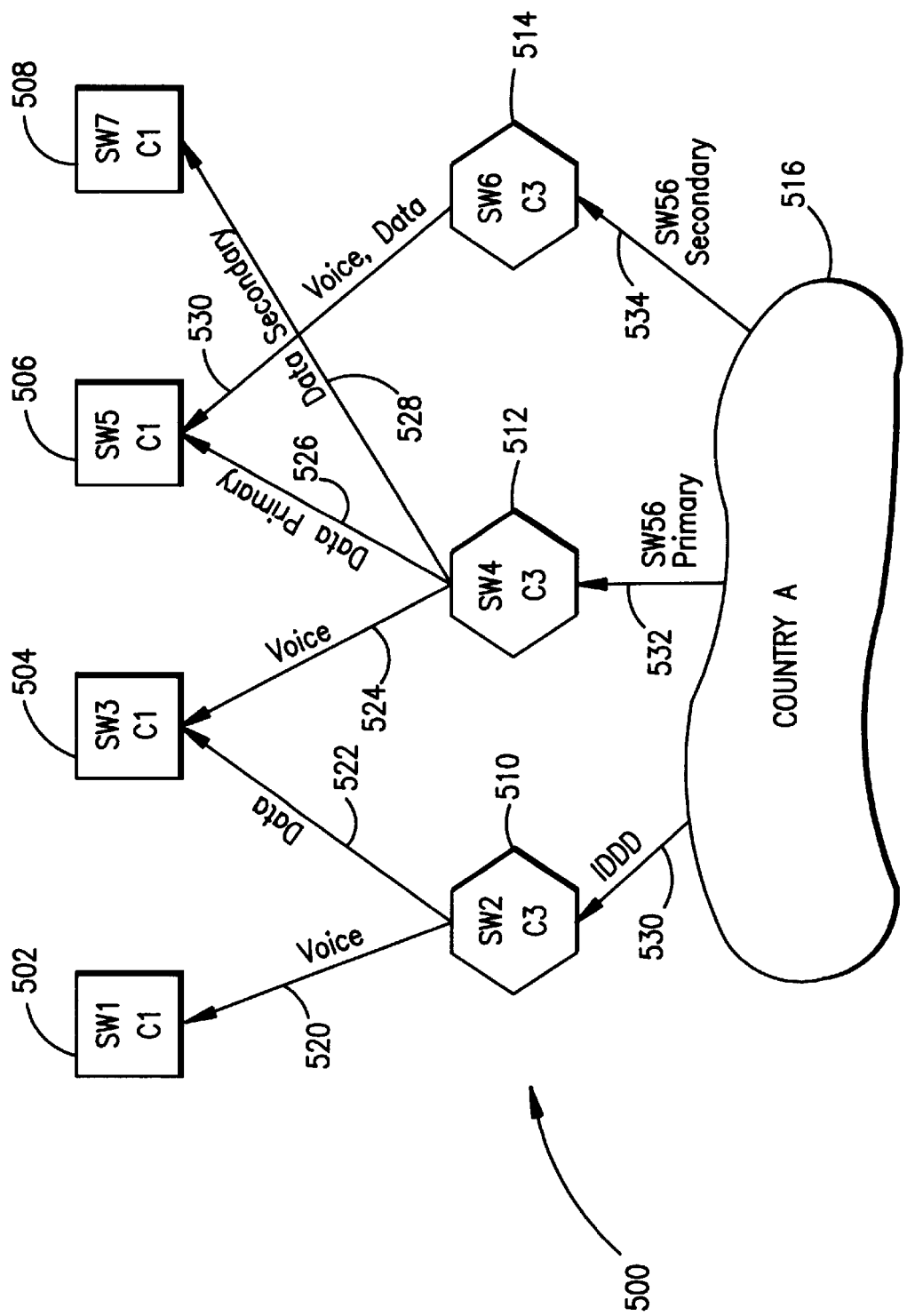
FIG. 5 is a switch hierarchy with multiple services provided for international calls.

FIG. 5 depicts a switch hierarchy 500 over which international telephone calls can be routed. The international telephone calls routed over the hierarchy 500 are intended for country A 516. Four class 1 switches are illustrated in FIG. 5. They are SW1 502, SW3 504, SW5 506, and SW7 508. The class 1 switches are homes to three class 3 switches. The class 3 switches are SW2 510, SW4 512, and SW6 514. SW1 502 is home to SW2 510 for voice services carried over trunk 520. SW3 504 is home to SW2 510 for data services carried over trunk 522. SW3 504 is also home to SW4 512 for voice services carried over line 524. SW5 506 provides the primary home for data services for SW4 512 over trunk 526. SW5 506 also provides the home for voice and data services for SW6 514 over trunk 530. SW7 508 provides the secondary home for data services for SW4 512. Similarly, SW2 provides homing for country A 516 for IDDD services over trunk 530. SW4 provides primary homing for SW56 services for country A 516 over trunk 532. SW6 provides secondary homing for SW56 services for country A 516 over trunk 534.

The switch homing table stores the above-described homing relationships for each of the switches in the network. The table includes any primary, secondary, and other relationships required for generating the routing rules. Table 1 illustrates an example of the format of the switch home table for the network of FIG. 5 according to a preferred embodiment.

TABLE I

| Destination | Service | Primary Home | Secondary Home |
|---|---|---|---|
| SW2 | Voice | SW1 | |
| SW2 | Data | SW3 | |
| SW4 | Voice | SW3 | |
| SW4 | Data | 5W5 | SW7 |
| SW6 | Voice | 5W5 | |
| 5W6 | Data | 5W5 | |

According to the preferred embodiment, the Switch Home Table, shown in Table I, has a plurality of four-field entries. It would be apparent to one skilled in the art that the number of fields can vary depending on implementation of the concepts disclosed by the present invention. The four fields of each entry in the preferred embodiment are a destination field, a service field, a primary home field, and a secondary home field. The destination field holds the identity of a switch that is homed to another switch. The service field identifies the service provided by the particular homing relationship. In the preferred embodiment, there are two services, data and voice, that a switch can provide. It would be apparent to one skilled in the art that the service field can be adapted to include new services, should such services become available. The primary home field identifies the switch which serves as the primary home of the switch identified in the destination field. The secondary home field identifies the switch which serves as the secondary home of the switch identified in the destination field. The use of primary and secondary homing allows for redundancy and, correspondingly increases the robustness of the network. For example, the fourth entry in Table I indicates that SW4 is homed to two different switches for providing data services. The preferred choice is SW5. SW5 is designated as the preferred choice by being placed in the primary home field of the fourth entry in Table I. The secondary choice is SW7. SW7 is designated as the secondary choice by being placed in the secondary home field of the fourth entry.

The second network description table is a country home table. The country home table is similar to the switch homing table, but provides homing information for countries to which international calls can be placed. A country home table according to the present invention for the network illustrated in FIG. 5 is given in Table II.

TABLE II

| Country | Service | Primary Home | Secondary Home |
|---------|---------|--------------|----------------|
| A | IDDD | SW2 | |
| A | SW56 | SW4 | SW6 |

Like the switch home table, the country home table according to the preferred embodiment contains a plurality of entries, each having four fields. The four fields are a country field, a service field, a primary home field, and a secondary home field. It would be apparent to those skilled in the art that a different number of fields may be incorporated in a specific implementation of the teaching of the present invention. The service, primary home, and secondary home fields are analogous to the corresponding fields in the switch home table. Note however, that the international services in the country home table differ from the data and voice services provided at the switch home level. As shown in Table II, services provided at the country level include International Direct Distance Dialing (IDDD) and Switched 56 Kbps (SW56). In Table II, IDDD represents a flag that indicates whether the service provider can provide the IDDD service. In Table II, SW56 represents a flag that indicates whether the service provider can provide the SW56 service. In the preferred embodiment, different routes are used to complete IDDD and SW56 services.

A third network description table is the switch partition table. A switch partition table according to a preferred embodiment is illustrated in Table III. Partitions are described below.

TABLE III

| Service | DMS Trans | Dex Partition |
|---------|-----------|---------------|
| IDDD | STD250 | 31 |
| SW56 | STD064 | 32 |

As shown in Table III, the switch partition table contains a plurality of three-field entries. It would be apparent to those skilled in the art that a different number of fields may be incorporated in a specific implementataion of the teaching of the present invention. For example, in an alternate preferred embodiment, the switch partition field contains a customer field for indicating a specific customer to which a partition applies. The customer field in the alternative preferred embodiment can be in addition to or in lieu of the service field (described below) of the switch partition table. The three fields in the switch partition table of the preferred embodiment are a service field, a DMS trans field, and a Dex partition field. The service field indicates the particular international service to which a particular partition applies. Although the preferred embodiment strives to avoid switch vendor specific notations, this is not always possible. The DMS Trans and Dex Partition fields are a result of vendor specific notations. The DMS Trans field refers to the actual architecture of a particular table in a DMS switch. The particular table in the DMS switch includes a field called the translation scheme name. This field is referred to as DMS trans in the preferred embodiment. The Dex partition field is similar to the DMS Trans field. The primary difference is that the translation name in the DMS can be a name whereas the Dex partition must be a number.

Using the network description tables, routing is generated according to the aforementioned routing rules. The use of the routing rules is explained in more detail with reference to FIGS. 3–4. In the figures, the following convention is followed. Squares indicate a class 1 switch. Triangles indicate a class 2 switch. Circles indicate a class 3 switch. Hexagons indicate a gateway switch. A routing generation method 400 is illustrated in FIG. 4. In the preferred embodiment, the routing generation method 400 executes on a routing generator (described below with reference to FIG. 8), or a computer system (described below). The routing generation method 400 begins in step 402 where control immediately passes to step 404. In step 404, switch 322 determines if it can route a telephone call directly to the country 360 over link 301. In the preferred embodiment, link 301 is a trunk coupling the country 360 to the switch 322. If such a link is available, the call is routed to the country 360 and the routing generation method 400 is complete, as indicated by step 424. In this case subsequent international calls are routed from the switch 322 to the country directly over link 301.

In most cases, direct routing to the country 360 is not available. If direct routing is not available, the routing generation method 400 continues in step 406. In step 406, the method 400 determines whether the call can be routed to the primary home gateway 324 on which the country 360 is homed. The primary home gateway 324 is the preferred gateway through which calls are routed to the country 360. There are a variety of reasons to choose a particular gateway as the preferred gateway including arrangements made with a particular destination country and trunk capacity in the international gateway. If the telephone call can be routed to the primary gateway 324, the call is so routed and the method 400 continues in step 424, where it ends.

If the telephone call can not be routed through the primary gateway 324, the method continues in step 408. In step 408, the method 400 determines whether a call can be routed to the secondary gateway 326 on which the country 360 is homed. Secondary switches, such as secondary gateway 326 are provided in the network to provide redundancy in the switch hierarchy. If the telephone call can be routed to the secondary gateway 326, the call is so routed and the method 400 continues in step 424, where it ends. If the telephone call cannot be routed to the secondary gateway 326, the method 400 continues in step 410.

In step 410, the method 400 attempts to route the telephone call to the primary home of the primary gateway. In the example hierarchy of FIG. 3, the primary home of the primary gateway is switch 332. If the telephone call can be routed to switch 332, the call is so routed and the method continues in step 424 where it ends. If the telephone call cannot be routed to switch 332, the method continues in step 412.

In step 412, the method 400 attempts to route the telephone call to the secondary home of the primary gateway. In the example hierarchy illustrated in FIG. 3, the secondary home of the primary gateway is switch 334. If the telephone call can be routed to switch 334, the call is so routed and the method continues in step 424 where it ends. If the telephone call cannot be routed to switch 334, the method continues in step 414.

In step 414, the method 400 attempts to route the telephone call to the primary home of the secondary gateway. In the example hierarchy illustrated in FIG. 3, the primary home of the secondary gateway is switch 336. If the telephone call can be routed to switch 336, the call is so routed and the method continues in step 424 where it ends. If the telephone call cannot be routed to switch 336, the method continues in step 416.

In step 416, the method 400 attempts to route the telephone call to the secondary home of the secondary gateway. In the example hierarchy illustrated in FIG. 3, the secondary home of the secondary gateway is switch 338. If the telephone call can be routed to switch 338, the call is so routed and the method continues in step 424 where it ends. If the telephone call cannot be routed to switch 338, the method continues in step 418.

In step 418, the method 400 attempts to route the telephone call to its own primary home. In the example hierarchy illustrated in FIG. 3, the primary home of switch 322 is switch 328. If the telephone call can be routed to switch 328, the call is so routed and the method continues in step 424 where it ends. If the telephone call cannot be routed to switch 328, the method continues in step 420.

In step 420, the method 400 attempts to route the telephone call to its own secondary home. In the example hierarchy illustrated in FIG. 3, the secondary home of switch 322 is switch 330. If the telephone call can be routed to switch 330, the call is so routed and the method continues in step 424 where it ends. If the telephone call cannot be routed to switch 330, the method continues in step 422.

In step 422, the method 400 routes the call using a dedicated WATS line. Step 422 is a default state for the method 400. That is, the present invention defaults to routing to a WATS line if there is no other routing available. This default condition increases the likelihood of completing a telephone call if no prior switch in the preferred routing is available.

Figure 6:
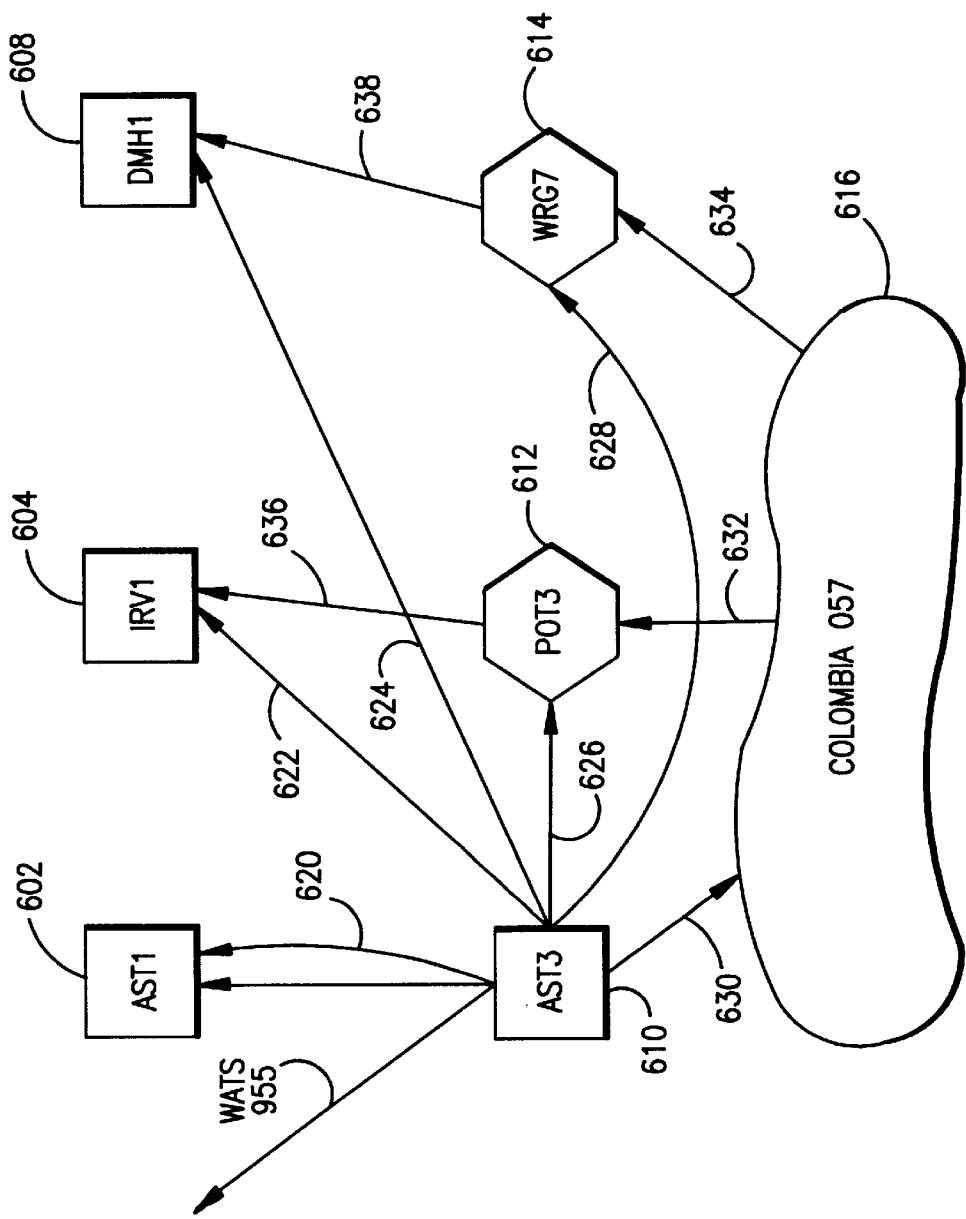
FIG. 6 is a switch hierarchy according to a preferred embodiment of the present invention.

Application of the routing rules according to the flow chart in FIG. 4 results in one or more tables associated with routing telephone calls throughout the switch hierarchy. There are two tables according to a preferred embodiment of the present invention. The tables are described with reference to FIG. 6. FIG. 6 is a simplified hierarchy to illustrated the concept of routing table generation. In FIG. 6, the various labels for the switches indicate where the switch is located. For example, in FIG. 6, AST1 is a switch located in Austell, Ga., AST3 is a second switch located in Austell, Ga., IRV1 is a switch located in Irving, Tex., DMH1 is a switch located in Dominguez Hills, Calif., POT3 is a switch located in Pottstown Pa., and WRG7 is a switch located in West Orange, N.J.

The first table is a country route index table. The country route index table stores unique identifiers, called country route indexes. Each country route index is an element in a switch that is used to point to a list of route choices to be used to complete a call. Architecturally, a country code exists in a table in a switch associated with the route index. The route index serves as a pointer to another table that contains the route choices. A country route index table according to a preferred embodiment of the present invention is given in Table IV. In Table IV, the country code 057 corresponds to Colombia 616.

Switch 610 is an AST3 switch. In the example of FIG. 6, it is assumed that a network description table in accordance with the above described technique has been generated.

TABLE IV

| Country Code | From Station | To Station | Partition | Switch | Route Index |
|---|---|---|---|---|---|
| 057 | 000000000 | 999999999 | STD250 | 610 | 1 |

The second kind of routing table is a Country Route Choice table. The Country Route Choice table stores the routing list for a particular switch in the switch hierarchy using the network description tables. For example, a Country Route Choice table according to a preferred embodiment is given for switch AST3 610 in table V.

TABLE V

| Switch Name | Partition | Route Index | Route Choice List |
|---|---|---|---|
| AST3 | STD250 | 1 | 255 100S 101S 102S 103S 104S 955 057 POT3 WRG7 IRV1 DMH1 AST1 WATS |

The Country Choice Routing Table stores a preferred routing list for each switch in a switch hierarchy. The preferred routing list is a list of pairs of trunk groups and destinations. For example, the second pair in table V, (100S, POT3), indicates that a call should be routed from switch AST3 610 to gateway switch POT3 612 using the trunk group 100S. A trunk group is a logical path between two switches.

In the preferred embodiment, the list of pairs of trunk groups and destinations is saved in order of preference. By so ordering the list, available routing according to preference can be checked more easily. That is the system need only parse the list of pairs and check for routing availability in the order that pairs are encountered in the list. In the preferred embodiment, the preference order of the list of pairs directly corresponds to the priority order of the routing rules described above. Thus, in Table V, the first preference routing for index 1 in partition STD250 would be from switch AST3 610 to Colombia 616 over trunk line 25S (item 630 in FIG. 6), followed by routing from switch AST3 to gateway POT3, and so on until finally the default state routing from switch AST3 through WATS 955 is used.

The "S" at the end of the trunk groups indicates that the call should be transmitted with 7 digits, that is if standard outpulsing is used. As would be apparent to those skilled in the art, various outpulsing methods exist. Each can be differentiated by a different designator. Outpulsing is beyond the scope of the present invention and will not be discussed further.

The addition of international routing presents several complications not encountered with domestic routing. Most notable is that domestic routing provided only one service.

This service is voice. International routing provides multiple services in addition to voice. These services include IDDD and SW56. Note that a second service will be added to domestic routing in the future. The second service is data. A partition according to the preferred embodiment can be used to control the data service in an analogous manner to controlling the IDDD and SW56 services.

In order to efficiently represent the multiple services in the software environment of the present invention, the preferred embodiment separates the services into partitions. A partition is a set of tables in a switch that has substantially the same data to other partitions with the exception of data specific to the partition. For example, consider a system in which there are two customers, customer A and customer B. Customer A has a requirement that calls to a certain area be blocked. Customer B has no such requirement. In a conventional system, all calls to the area are blocked. However, using partitions according to a preferred embodiment of the present invention allows exception routing for customer A such that calls to the area are blocked. Customer B on the other hand, has a routing, for example the default routing, that enables calls to the area. Thus, partitions provide advantages to end users in terms of flexibility. In the preferred embodiment, there can be a distinct partition for each service.

In general, long distance service in the U.S. is straightforward. To make a long distance call, a customer dials 1, an area code, and the phone number. Thus, U.S. long distance is relatively standard. In international calls, however, each foreign country has its own set of routing rules. Some countries have more than one carrier. In addition, many international subscribers have specific requirements for their calls. Moreover, the calling access arrangements with each country are so convoluted that there is no alternative but to create a partition for each country.

As described above, in the preferred embodiment, the associations of partitions to services is stored in a network description table called a Switch Partition Table. A Switch Partition Table according to a preferred embodiment of the present invention is illustrated in Table III above.

As can be seen in Tables IV and V above, the preferred embodiment includes a field in the table data structure for identifying which partition is appropriate for routing a call that employs a particular service. The use of partitions in the preferred embodiment enables a user of the present invention to more easily identify which routing table to use for a particular service. Moreover, the use of partitions provides an easy and efficient memory allocation paradigm for associating routing with a particular service, country, or customer that requires "exception" treatment. Exception treatment refers to special treatment not conforming to a default state. For example, if a default state indicated that no calls are blocked, then a customer requiring call blocking would have an exception treatment partition to generate a routing for call blocking.

After the routing tables are generated, the routing tables must be downloaded to the physical switches in the switch hierarchy. In the preferred embodiment, the downloading is accomplished by interface software called the Common Switch to host Interface Package (CommSHIP), although any interface means having the functionality described herein may be used.

A CommSHIP interface 706 provides a means of managing and transporting data between a network management system 702 and switches, e.g., switches 714, 716, 718, and 720 in a switch hierarchy. The network management system 702 uses the CommSHIP interface 706 to upload and download routing data to domestic switches in the switch hierarchy.

A CommSHIP interface 706 manages uploads and downloads to the switches 714, 716, 718, and 720 by communicating with an Interactive Device Control System (IDCS). In the preferred embodiment, the communication uses the SNA protocol from IBM Corp. The IDCS primarily acts as an interface between an SNA network 708 and an X.25 network 712. The switches 714, 716, 718, and 720 are coupled to the X.25 network. The X.25 network standard is well known. The IDCS converts data that it receives from the CommSHIP interface in the SNA format to the X.25 format.

The CommSHIP interface 706 manages uploads and downloads to the switches 714, 716, 718, and 720 using a logical unit of work called a batch. A batch is associated with an application, such as the network management system 702, and a project within that application. A batch includes multiple transactions. In the management system of the preferred embodiment, a transaction is one or more switch commands. The switch commands add, change, or delete routing data on a switch 714, 716, 718, or 720. In the preferred embodiment, the CommSHIP interface 706 can manage uploading and downloading data to 55 switches simultaneously. When uploading or downloading data, the CommSHIP interface 706 emulates the Human Machine Interface (HMI) that a switch operator would use when interacting with a switch through a terminal directly connected to the switch.

In the preferred embodiment, the network management system 702 communicates with the CommSHIP interface 706 through two database tables 705 and 707 located in database 704. The database tables 705 and 707 contain batch and transaction information in a generic routing format. Table IV and V above are examples of the generic routing format stored in the database tables 705 and 707. The CommSHIP interface translates the generic routing format into a format that is specific to the particular switch 714, 716, 718, or 720 to which the data is to be downloaded. In the preferred embodiment, the CommSHIP interface continuously checks the database tables 705 and 707 to determine if new batches have arrived. When a new batch arrives, the CommSHIP interface 706 logs on to the switch 714, 716, 718, or 720 and executes the transactions in the batch. When all of the transactions in a batch have been executed, the CommSHIP interface 706 informs the network management system 702 that the batch has been completed. The network management system 702 then updates a database that it contains to indicate that the data has been loaded into the switch 714, 716, 718, or 720. In this manner, the network management system 702 can automatically update routing information in the switch hierarchy.

Figure 8:
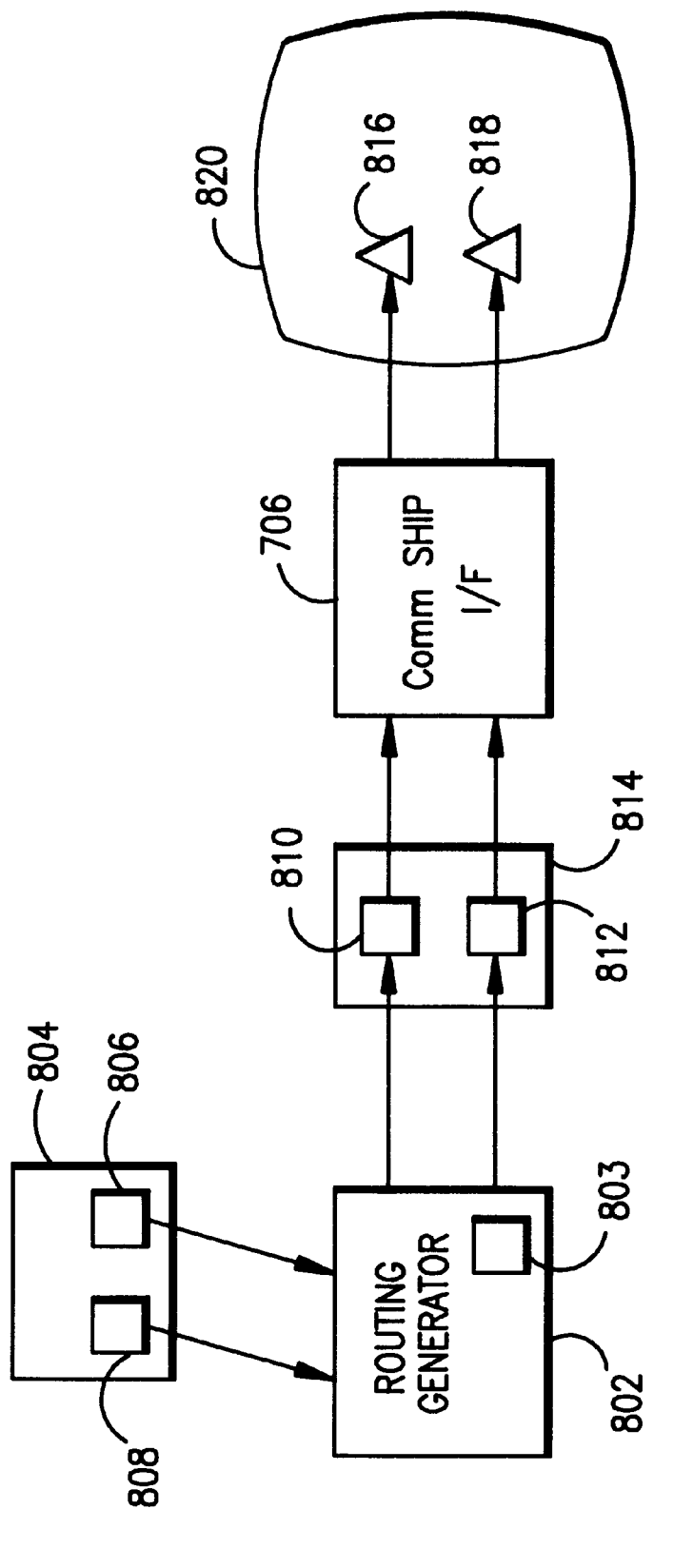
FIG. 8 is a system for generating a routing plan according to a preferred embodiment of the present invention.

FIG. 8 is a system 800 for generating routing in a switch hierarchy 820 according to a preferred embodiment of the present invention. The switch hierarchy contains switches 816 and 818. The system 800 generates routing tables that are downloaded into switches 816 and 818. In FIG. 8, a routing generator 802 applies network description data stored in network description tables 806 and 808 to a set of routing rules 803 in the manner described above to generate routing tables 810 and 812. The network description tables 806 and 808 are stored in a storage device 804. The storage device 804 can be any storage device including a RAM memory, a database management system, a floppy disk, a hard disk, and an optical storage device. The routing tables 810 and 812 are stored in a storage device 814. The storage device 814 can be any storage device including a RAM memory, a database management system, a floppy disk, a hard disk, and an optical storage device.

Figure 7:
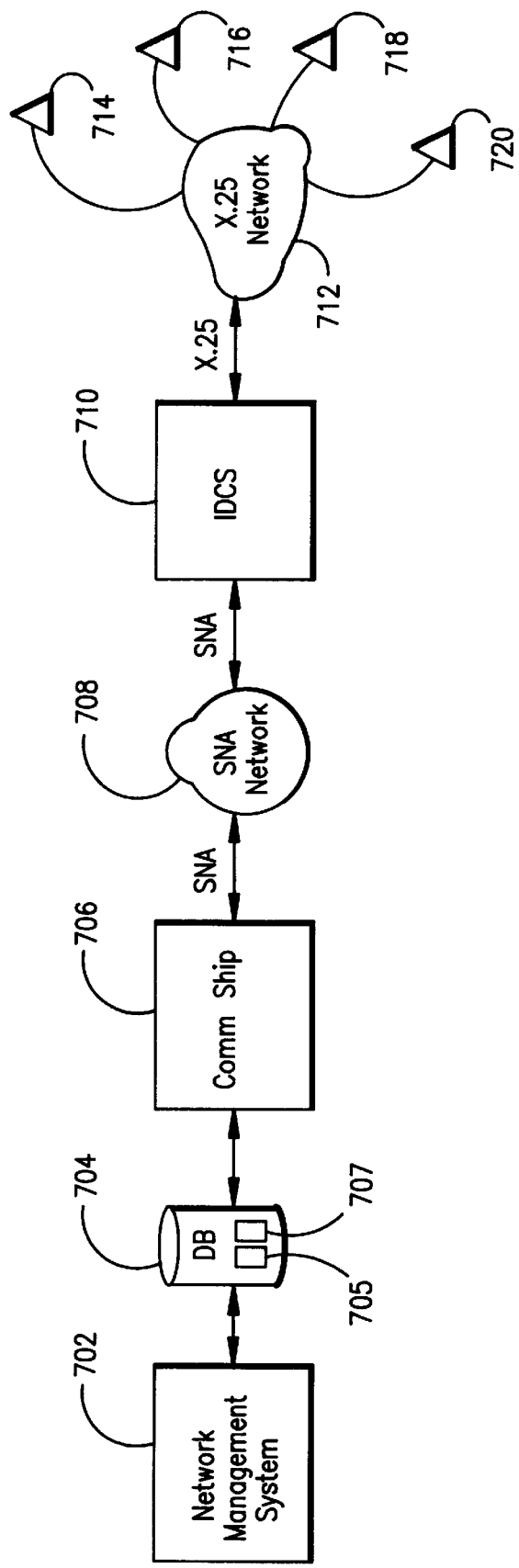
FIG. 7 is a communications interface for converting generic routing tables generated by a routing generator into a format understandable by switches in a switch hierarchy.

Because the routing generator 802 generates the routing tables 810 and 812 in a generic format, an interface 706 is required to translate the routing tables 810 and 812 into a format understandable by switches 816 and 818. The interface 706 is described above with reference to FIG. 7.

Figure 9:
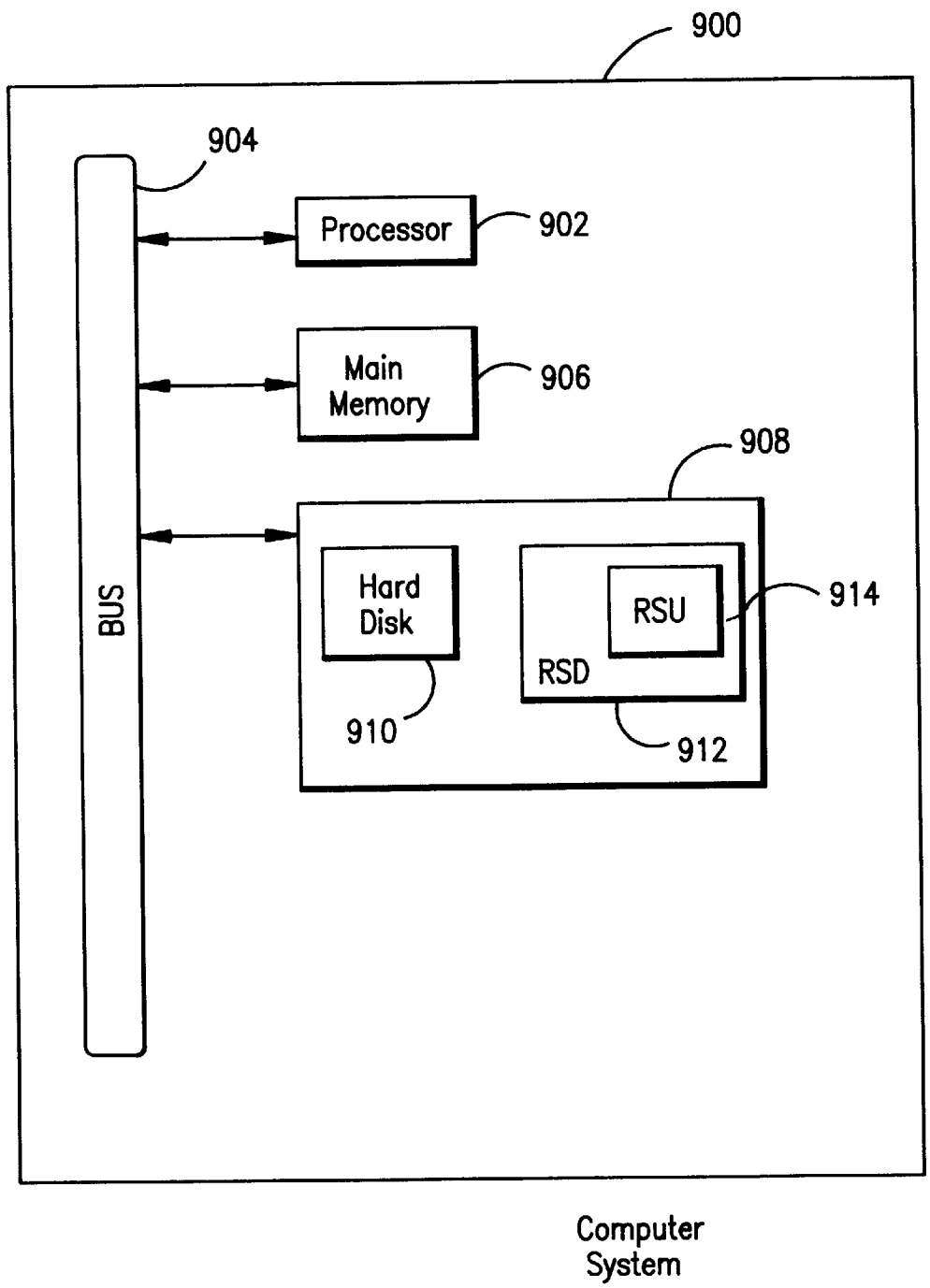
FIG. 9 is a computer system for executing a computer program according to the preferred embodiment of the present invention.

The routing generator 802 and CommSHIP interface 710 and/or other components of the invention can be implemented on a computer system (or on multiple computer systems) operating as discussed herein. An exemplary computer system 900 is shown in FIG. 9. The computer system 900 includes one or more processors, such as processor 902. The processor is connected to a communication bus 904.

The computer system 900 also includes a main memory 906, preferably random access memory (RAM), and a secondary memory 908. The secondary memory 908 includes, for example, a hard disk drive 910 and/or removable storage drive (RSD) 912, representing a floppy disk drive, magnetic tape drive, a compact disk, etc. The removable storage drive 912 reads from and/or writes to a removable storage unit (RSU) 914 in a well known manner. In the preferred embodiment the storage devices 804 and 814 are hard disk drives, such as hard disk drive 910.

Removable storage unit 914, also called a program storage device or a computer program product, represents a floppy disk, magnetic tape, compact disk, etc. As will be appreciated by any person skilled in the art to which the present invention pertains, the removable storage unit 914, includes a computer useable storage medium having stored therein computer software and/or data.

Computer programs (also called computer control logic) are stored in main memory and/or the secondary memory 908. Such computer programs, when executed, enable the computer system 900 to perform the features of the present invention as discussed herein. In particular, the computer programs, when executed, enable the processor 902 to perform the features of the present invention. Accordingly, such computer programs represent controllers of the computer system 900.

In another embodiment, the present invention is directed to a computer program product comprising a computer readable medium having control logic (computer software) stored therein. The control logic, when executed by the processor 902, causes the processor 902 to perform the functions of the invention as described herein.

In another embodiment, the present invention is implemented primarily in hardware using, for example, a hardware state machine. Implementation of the hardware state machine so as to perform the functions described herein will be apparent to persons skilled in the art to which the present invention pertains.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for automatically generating a routing plan in an international telephone call processing switch hierarchy to provide international telephone call processing for telephone calls to a foreign country, said switch hierarchy having a gateway on which telephone call processing to said foreign country is homed, comprising:

one or more network description tables stored in the system to store a representation of the switch hierarchy including country information related to the foreign country;

a routing generator configured to receive said one or more network description tables to generate a routing table for a switch in said hierarchy by applying data stored in said network description tables to a set of routing rules stored in the system; and an interface configured to receive said routing table to reformat said routing table into a reformatted routing table that is understandable by said switch in said hierarchy, said interface including a downloader to download said reformatted routing table to said switch in said hierarchy for automatically configuring routing in said hierarchy to provide international telephone call processing for telephone calls to the foreign country.

2. The system as recited in claim 1, further comprising a batch containing transactions that modify a state of a switch in said hierarchy, wherein said interface processes said batch by executing transactions in said batch to thereby modify said state.

3. The system as recited in claim 2, further comprising a database to store information related to converting said routing table to said reformatted routing table, wherein said interface substantially continuously monitors said database to determine if there is a new batch, and if there is a new batch, said interface downloads said new batch to said switch, and executes transactions in said new batch to thereby automatically update said switch.

4. The system as recited in claim 1, wherein said routing table includes a partition entry field for identifying a plurality of partitions, each partition of said plurality of partitions corresponding to a particular service provided by international telephone call routing.

5. The system as recited in claim 4, wherein said particular service is International Direct Distance Dialing.

6. The system as recited in claim 1, wherein said routing generator generates a unique table for each switch in said hierarchy, said interface generates a unique reformatted table for each switch corresponding to said unique table for each switch, and said downloader downloads said unique reformatted table for each switch to a particular switch in said hierarchy to which said unique reformatted table corresponds.

7. A computer program product for use in a computer system, comprising:

a computer usable medium having computer readable program code means embodied thereon, for enabling a processor to automatically configure routing in an international telephone call processing switch hierarchy to provide international telephone call processing for telephone calls to a foreign country, said switch hierarchy having a gateway on which telephone call processing to said foreign country is homed, said computer, readable program code means comprising:

computer readable program code storing means for enabling the processor to store a representation of the switch hierarchy including country information related to the foreign country;

computer readable program code routing generation means for enabling the processor to generate a routing table for a switch in said hierarchy by applying data stored in said network description tables to a set of routing rules stored in the system; and computer readable program code interface means for enabling the processor to reformat said routing table into a reformatted routing table that is understandable by said switch in said hierarchy, said computer readable program code interface means including computer readable program code downloading means for enabling the processor to download said reformatted routing table to said switch in said hierarchy for automatically configuring routing in said hierarchy to provide international telephone call processing for telephone calls to the foreign country.

8. The computer program product as recited in claim 7, further comprising computer readable program code batch means containing transactions from a batch for enabling the processor to modify a state of a switch in said hierarchy, wherein said computer readable program code interface means processes said computer readable program code batch means by enabling the processor to execute transactions in said batch to thereby modify said state.

9. The computer program product as recited in claim 8, further comprising computer readable program code database means for enabling the processor to store information related to converting said routing table to said reformatted routing table, wherein said computer readable program code interface means enables the processor to substantially continuously monitor said computer readable program code database means to determine if there is a new batch, and if there is a new batch, said computer readable program code interface means enables the processor to download said new batch to said switch, and enables the processor to execute transactions in said new batch to thereby automatically update said switch.

10. The computer program product as recited in claim 7, wherein said routing table includes a partition entry field for identifying a plurality of partitions, each partition of said plurality of partitions corresponding to a particular service provided by international telephone call routing.

11. The computer program product as recited in claim 10, wherein said particular service is International Direct Distance Dialing.

12. The computer program product as recited in claim 7, wherein said computer readable program code routing generation means enables the processor to generate a unique table for each switch in said hierarchy, said computer readable program code interface means enables the processor to generate a unique reformatted table for each switch corresponding to said unique table for each switch, and said computer readable program code downloading means enables the processor to download said unique reformatted table for each switch to a particular switch in said hierarchy to which said unique reformatted table corresponds.

13. A method for automatically configuring routing in an international telephone call processing switch hierarchy to provide international telephone call processing for telephone calls to a foreign country, said switch hierarchy having a gateway on which telephone call processing to said foreign country is homed, comprising the steps of:

storing in one or more network description tables a representation of the switch hierarchy including country information related to the foreign country;

generating a routing table for a switch in said hierarchy by applying data stored in said network description tables to a set of routing rules;

reformatting said routing table into a reformatted routing table that is understandable by said switch in said hierarchy; and downloading said reformatted routing table to said switch in said hierarchy for automatically configuring routing in said hierarchy to provide international telephone call processing for telephone calls to the foreign country.

14. The method as recited in claim 13, further comprising the step of modifying a state of a switch in said hierarchy according to transactions contained in a batch.

15. The method as recited in claim 14, further comprising the step of substantially continuously monitoring data stored in a database to determine if there is a new batch, and if there is a new batch, downloading said new batch to said switch, and executing transactions in said new batch to thereby automatically update said switch.

16. The method as recited in claim 13, wherein said routing table includes a partition entry field for identifying a plurality of partitions, each partition of said plurality of partitions corresponding to a particular service provided by international telephone call routing.

17. The method as recited in claim 13, wherein said generating step generates a unique table for each switch in said hierarchy, said reformatting step generates a unique reformatted table for each switch corresponding to said unique table for each switch, and said downloading step downloads said unique reformatted table for each switch to a particular switch in said hierarchy to which said unique reformatted table corresponds.

18. The method as recited in claim 16, wherein said particular service is International Direct Distance Dialing.

19. The system as recited in claim 1, wherein said set of routing rules is based upon homing relationships of the switch hierarchy.

20. The computer program product as recited in claim 7, wherein said set of routing rules is based upon homing relationships of the switch hierarchy.

21. The method as recited in claim 13, wherein said set of routing rules is based upon homing relationships of the switch hierarchy.

* * * * *